United States Patent [19]

Frost, III

[11] E Re. 31,507

[45] Reissued Jan. 24, 1984

[54] METHOD OF TREATING PAPERMAKING WHITE WATER

[75] Inventor: Arthur W. Frost, III, Park Ridge, N.J.

[73] Assignee: Federal Paper Board Company, Inc., Montvale, N.J.

[21] Appl. No.: 297,775

[22] Filed: Aug. 31, 1981

Related U.S. Patent Documents

Reissue of:

[64] Patent No.: 4,221,634
Issued: Sep. 9, 1980
Appl. No.: 13,088
Filed: Feb. 21, 1979

[51] Int. Cl.[3] ..... D21F 1/66

[52] U.S. Cl. ..... 162/190; 210/702; 210/748; 204/160.1

[58] Field of Search ..... 204/159.12, 160.1, 158 R, 204/157.1; 210/702, 748; 162/29, 190; 422/24

[56] References Cited

U.S. PATENT DOCUMENTS

| | | | |
|---|---|---|---|
| 2,240,403 | 4/1941 | Karlstrom | 210/723 |
| 3,561,933 | 2/1971 | Restaino | 204/159.12 |
| 3,677,935 | 7/1972 | Spragg | 210/748 |
| 3,821,073 | 6/1974 | Eriksson | 162/190 |
| 4,009,073 | 2/1977 | Pozzo | 162/190 |
| 4,021,295 | 5/1977 | Schmaeng | 162/190 |
| 4,115,188 | 9/1978 | O'Brien | 162/190 |
| 4,141,686 | 2/1979 | Lewis | 422/24 |

FOREIGN PATENT DOCUMENTS

| | | | |
|---|---|---|---|
| 48-17471 | 3/1973 | Japan | 204/157.1 R |
| 562135 | 8/1958 | United Kingdom | 162/190 |
| 1236019 | 6/1971 | United Kingdom | 210/748 |

OTHER PUBLICATIONS

Polymerization and Polymer Modification by Ionizing Radiation, Pinner, British Plastics, Oct. 1962, vol. 35, pp. 518–525.

A.B.I.P.C., vol. 37, No. 7, Jan. 1967, 5044.

Control of the Deposition of Silicon Nitride Layers by 2537Å Radiation, J. Electrochem Soc., vol. 119, No. 3, Mar. 1972, 372–376.

*Primary Examiner*—Ernest G. Therkorn
*Attorney, Agent, or Firm*—James T. FitzGibbon

[57] ABSTRACT

A method of treating papermaking white water which contains dissolved solids, usually of a biodegradable organic nature. According to the invention, the dissolved organic solids, which are objectionable because they cause process equipment corosion, undesirable product and process odors and water pollution, are treated with ultraviolet light so as to lower their concentration and eliminate these problems. The light treatment causes material of relatively simple chemical structure to polymerize into more complex, less soluble materials which can easily be removed from the system as they become less soluble. The method is applicable to papermaking and other industries process using large quantities of process water. The treatment cell, which preferably operates on clarified white water, may be placed in series with the process while water flow or in parallel therewith, and can be operated as a continuing treatment process or as a intermittent treatment process.

5 Claims, 5 Drawing Figures

FIG. 1
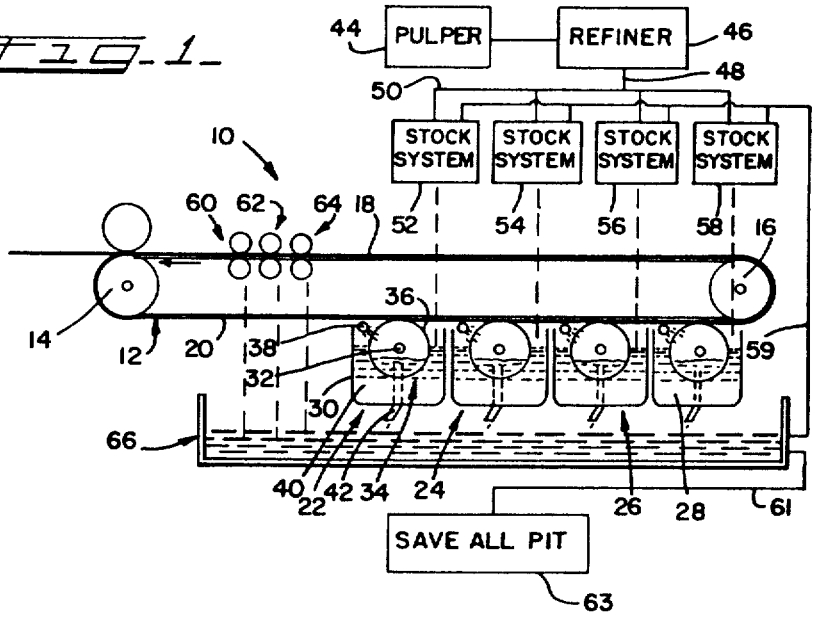
FIG. 5
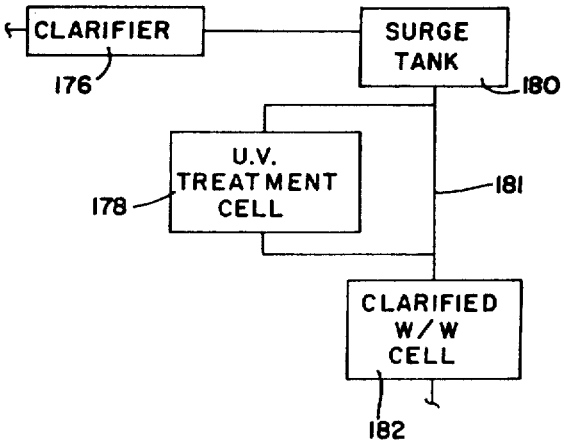
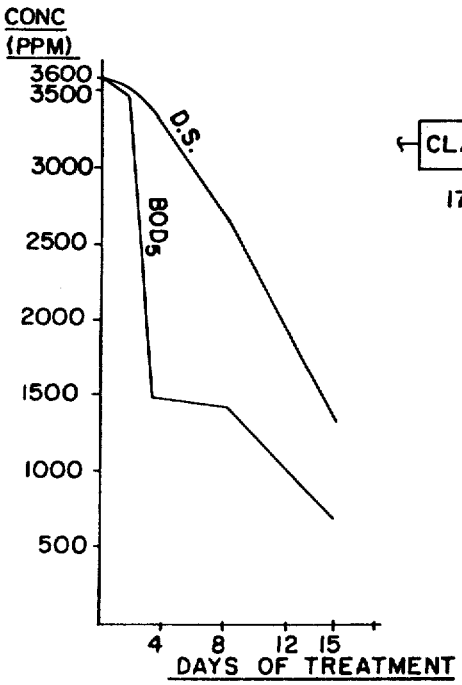
FIG. 3

METHOD OF TREATING PAPERMAKING WHITE WATER

Matter enclosed in heavy brackets [ ] appears in the original patent but forms no part of this reissue specification; matter printed in italics indicates the additions made by reissue.

BACKGROUND OF THE INVENTION

The present invention relates generally to water treatment, and more particularly to methods and apparatus for treating so-called "white-water" used in paper processing so as to reduce the biochemical or biological oxygen demand (B.O.D.) and also lower the concentration of dissolved organic solids in the white water. As is well known, the manufacture of paperboard and other paper products requires a great deal of water.

Typically, in the paperboard manufacture, waste paper products are pulped and refined, and then added to water to make a fiber slurry. The slurry is fed to one or more cylinder chests wherein the fibers are picked up from the slurry. The fibers are then transferred from the cylinders to a continuously moving screen, with each cylinder adding enough fibers to make an individual ply. Thus, a multiple-ply paper product is deposited and then removed from the screen after being passed through a series of rollers which squeeze the wet product to remove excess water therefrom.

Because of the increasing concern over water pollution, the increased cost of water, and the rapidly increasing cost of energy, there has been an increased interest in methods and apparatus for more efficient paper manufacture and processing.

Referring now to one problem in the paper industry, if white-water, particularly white-water used in the manufacture of paper from recycled paper products such as newsprint, kraft paper, paperboard and other box cuttings, etc., is discharged into open waters, serious environmental damage results because the white water has a high biological oxygen demand.

Oxidation of white water products depletes available oxygen in the water below desirable levels, damaging or threatening marine life supported by the ecosystem of which the stream or pond forms a part.

It is possible to avoid this problem by creating large treatment ponds or the like wherein the white water is stored until the solids dispersed therein settle out, and wherein the oxygen demand is eventually satisfied from the air or elsewhere from the treatment tank area. Because such ponds may be specially provided, damage to other water is avoided. However, the white water treatment pond approach is seriously disadvantageous in that it is time consuming, requires significant space, often creates highly obnoxious odors, and very importantly today, is highly wasteful of energy.

The energy waste involved in the reuse of treated white water comes from the requirement of reheating the clarified water up to mill use temperatures after it has been allowed to cool to ambient temperatures over a period of several days or more. With the high cost of gas, oil, or coal, the cost of lost heat is not only enormous, but is essentially a loss without offsetting advantages.

If the white water is reused without treatment, the solids content thereof builds up to the point where machinery becomes clogged and the paper product becomes damaged by discoloration, obnoxious odor, or both. The problem of solids buildup in white-water is a recurring problem not only because of the wide variety of recyclable papers fed to the stock chest, but also because the nature of the feed material is more or less uncontrolled. Examples of the materials which are present in the white-water resulting from recycling paper are carrier oils, the vehicle components of newsprint inks, residual lignins and other binders from recycled paper, starch and related decomposition products of cellulose, gums and perhaps other natural dispersants from paper adhesives, wet strength resins of various kinds, including ketene dimers, for example, and a wide variety of other organic materials. Moreover, there are many inorganic materials, such as carbonates, clays, and the like, a number and variety of which may be surface active and resist settling or separation by usual methods.

In addition to the problem of odor, white water with the above contaminants, particularly in the presence of bacteria, can become extremely corrosive, and, if not neutralized, will rapidly damage pipes, valves, and other elements of the paper processing equipment.

According to the invention, an apparatus for exposing the white-water to ultraviolet radiation makes possible the reduction of both dissolved solid materials and biological oxygen demand. Although the exact mechanism of the invention is not understood in detail, and although the invention is not limited to any particular theory of operation, it is believed that the exposure of the water to ultraviolet light serves to polymerize the simpler components of the materials in solution, rendering them insoluble and capable of ready separation. According to the invention, the process of separation can be carried out continuously so that the white water may be used over and over, with fibers being added periodically and impurities being removed continually, without creation of a process atmosphere which is characterized by corrosion, by obnoxious odors, or by pollution of outside waterways, no need for treatment lagoons, and the temperature drop and hence energy loss of the white water during processing is minimal.

In view of the shortcomings of the prior art methods of treating white water used in paper processing, it is an object of the invention to provide an improved method of processing papermaking white water.

Another object of the invention is to provide a method of treating white water which can be carried on continuously during the papermaking process and which does not require removal of white water periodically for processing in treatment lagoons.

A still further object is to provide a white water treatment method which is adaptable for use with existing paper processing equipment and which may be carried out continuously on the white water so as to render the white water reusable indefinitely in the papermaking process.

Another object is to provide a method of treating papermaking white water which cost as little or less than prior art treatments exclusive of the heat savings able to be achieved.

Still another object is to provide a white-water treating method which can be performed in an apparatus which can be readily added to existing paper processing equipment and which does not require changes to be made in such equipment. Another object is to provide a method of white water treatment which includes the step of treating the white water with ultraviolet light to induce polymerization of dissolved, polymerizable monomers into higher molecular weight, perhaps highly branched compounds, of decreased solubility so as to render the resulting compounds capable of ready separation from the white water.

Yet another object is to provide a method of white water treatment which permits white water to be treated at ambient temperatures characteristic of the papermaking process, thus eliminating the need for cooling and reheating the white water.

A still further object of the invention is to provide a method of reducing the biochemical or biological oxygen demand of papermaking white water so as to reduce the potential for creating [an anaerobic atmosphere which is conducive to the growth of anaerobic bacteria, which in turn create] highly corrosive, odiferous organic products, such as [hydrogent] *hydrogen* sulfide, butyric acid, and other such compounds.

Another object is to provide a method of treating papermaking white water so as to minimize the formation of by-products, particularly short chain organic acids, which tend to impart undesirable odors to the finished paper products *by anaerobic bacterial action.*

A still further object is to provide a method of treating papermaking white water which eliminates or reduces the buildup of dissolved organic solids which tend, particularly when the process equipment is shut down, to clog or foul process plumbing and fiber mats or screens on which the paper is laid.

Another object is to provide a method of papermaking white water treatment which enables the white water to be reused indefinitely, with the method involving the continuous maintenance of acceptable minimum level of dissolved organic solids and an acceptably reduced biological oxygen demand in the white water.

A still further object is to provide a method of treating papermaking white water which includes treating the water by withdrawing portions thereof from the system from time to time, thereby permitting the volume of treated water to be independent of the total volume being used by the mill at any given time.

Another object is to provide a method of treating papermaking white water in which the water may be treated periodically or intermittently, whether on a sampling basis or otherwise, and still achieve the intended result of reducing dissolved organic solids and biological oxygen demand.

A still further object is to provide a method of treating white water which will eliminate or reduce biological induced corrosion of the process equipment used in papermaking.

These and other objects and advantages of the invention are achieved in practice by treating the process [of white] water at process temperatures with ultraviolet light of a preferred frequency so as to polymerize dissolved materials and to separate the resulting materials from the white water intermittently or continuously during the papermaking process.

The manner in which these and other objects and advantages of the invention are achieved in practice will become more clearly apparent when reference is made to the accompanying detailed description of the preferred manner of practicing the invention set forth by way of example and illustrated in the accompanying drawings, wherein like reference numbers indicate corresponding parts throughout.

BRIEF DESCRIPTION OF THE DRAWINGS

FIG. 1 is a diagrammatic side elevational view showing the principle elements of a typical papermaking machine and showing the feed of the paper stock to the stock chests, the pickup cylinders, the moving screen which picks up the fiber from the cylinders and the paper machine pit;

FIG. 3 is a diagram showing the reduction of the concentration of dissolved solids and biological oxygen demand in the white water versus the length of treatment according to the invention;

FIG. 5 is a fragmentary diagrammatic view of a portion of the paper mill process water system shown in FIG. 2 but differing therefrom in detail.

DESCRIPTION OF THE PREFERRED EMBODIMENTS OF THE INVENTION

Figure 2:
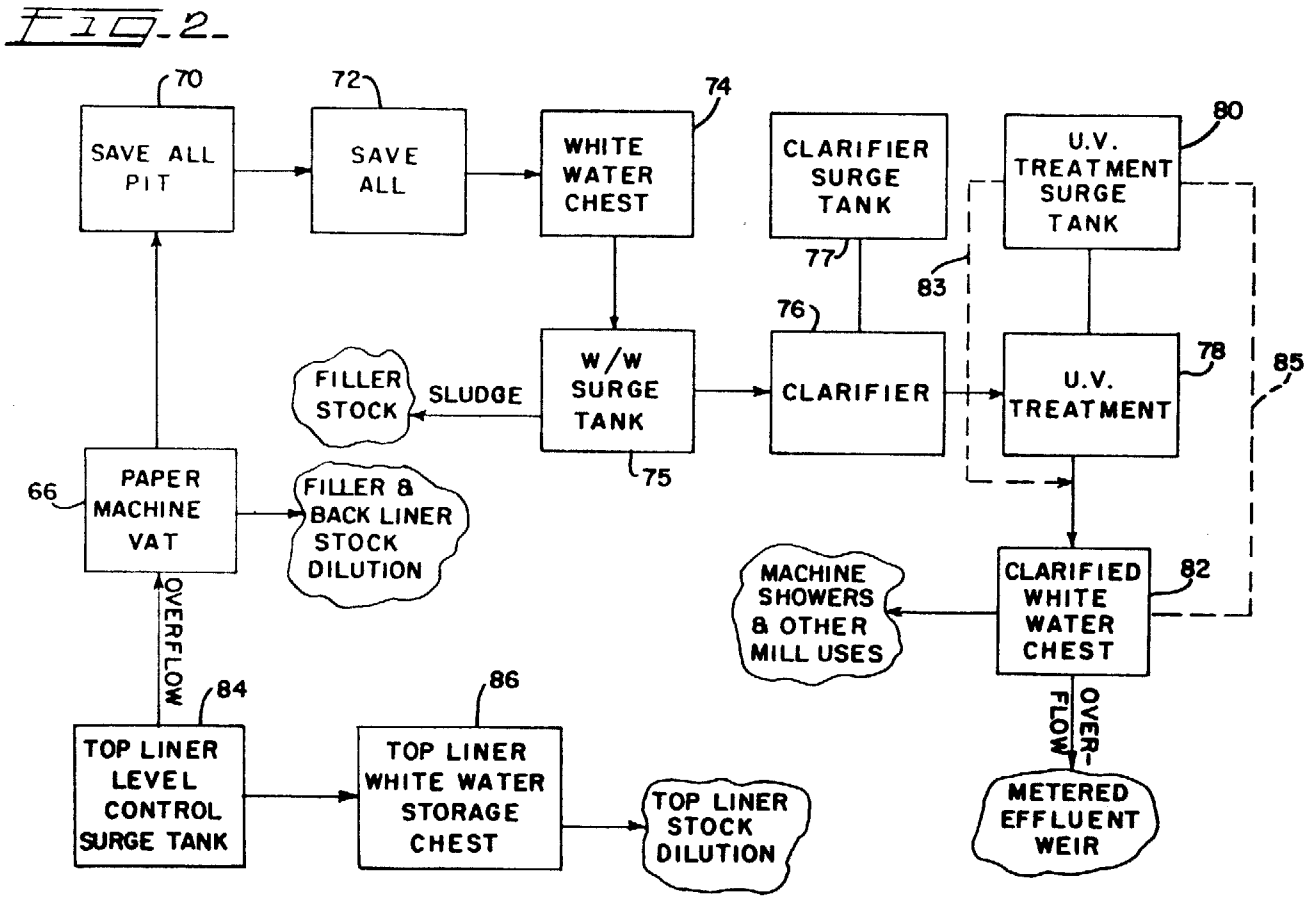
FIG. 2 is a block diagram showing the operation of a typical paper mill process water system and further showing the white water treatment which is the subject of the invention.

While the invention may be embodied in different forms, and while the treatment which is the subject of the invention may be used in different papermaking systems, a description will be made of a so-called cylinder board machine on which multiple plies paperboard is manufactured.

Referring now to the drawings in greater detail, FIG. 1 shows a typical cylinder type papermaking apparatus generally designated 10 and shown to include a continuous fiber belt 12, supported at one end by a drive roller 14 and at the other end by an idler roller 16. The upper run 18 and the lower run 20 of the fiber screen 12 are maintained under tension so as to be relatively taut.

Beneath the lower run 20 of the screen 12 are disposed a plurality of machine vats, with four vats 22, 24, 26, 28 being illustrated in FIG. 1. Inasmuch as each vat is identical except for the stock disposed therein, a description of one vat only is given. Typically, the cylinder vat 22 includes a water-tight exterior housing 30, supporting an axle 32 journalling a rotatable cylinder generally designated 34 and having an exterior surface 36 formed from a screen or like porous or foraminous material. A shower head 38 is also disposed within the housing 30, with the openings in the head 38 being directed in facting relation to the upper part of the cylinder 34.

[The] *In* operation, the cylinder 34 rotates clockwise picking up fibers from the slurry 40 in the vat 22, and depositing the fibers on the surface of the cylinder 36. The spray head 38 limits the amount of fibers building up on the cylinder. As may be seen, the water level on the interior of the cylinder is lower than that in the cylinder vat 22, with the interior being drained by the tube 42.

Other typical elements of the apparatus 10 shown in FIG. 1 included the pulper 44 wherein the fibers are dispersed by a slurrying apparatus known in the paper industry. The fibers from the pulper are passed to a refining unit 46 where desirable properties are developed in the slurry. The main outlet line 48 from the refiner 46 is connected to a manifold 50 from which the individual stock system chests 52, 54, 56, 58 are supplied with the paper slurry. Here, the solids content of the slurry is reduced, typically from 3% to 1%, by the addition of water through line 59 to which reference will be made later.

Each stock chest 52, 54 etc. feeds the diluted papermaking slurry to its associated cylinder vat 22, 24, etc. in a known manner. In the illustrated example, a slurry from the same refiner is fed to all the stock chests, which are, in turn, fed to their associated cylinder vats. From this, it will be appreciated that a paper product made on this machine will have four plies of substantially identically composition. If additional plies are desired to be made, it is customary to provide a stock chest for each ply which is made of a different composition.

In those cylinder machines which make paperboard with different plies, there is usually one chest which supplies the base ply or so-called bottom or back liner, four to six or more chests which apply identical, so-called filler or middle plies and one or two chests which apply a so-called top liner or top ply. In such system, there would be three different paper slurries, but at least some, and perhaps all, of the white water would be commonly used, as will appear.

As shown, the apparatus also includes a plurality of pairs 60, 62, 64 of nip rollers used to extract the water from the just-laid paper product by squeezing the water through the porous fiber belt 12. The water thus extracted, as shown by the phantom lines, along with the drain product from the cylinder stock chest 22, 25, etc. is returned to a large machine [vat] *pit* 66. The machine [vat] *pit* 66 supplies white water to the line 59, referred to above, which provides white water for dissolution to the stock chests 52, 54, etc. In addition, a line 61 feeds white water from the machine [vat] *pit* 66 to the so-clled save all pit 70. This pit 70 typically comprises a large concrete vat or tank in the passing of the paperboard mill. Consequently, most or all of the process water is directed to the so-called save all pit 70 at one time or another during processing.

According to the invention and, in keeping with ordinary paper processes, the white water from the save all pit 70 is white water which is the subject of the invention.

FIG. 2 illustrates circulation of the process water in a typical paper mill, not necessarily that using the machine of FIG. 1. This drawing shows the paper machine [vat] *pit* 66, the "save all" pit 70, a save all water supply 72, a white water chest 74, a white water chest [single] *surge* tank 75, a clarifier 76, a clarifier surge tank 77, an ultraviolet treatment cell or station 78, a treatment cell surge tank 80, and a clarified water chest 82, all connected as shown. Phantom lines 83, 85 show that water from the clarifier [76] *surge tank 77* may bypass the treatment cell 78, if there is an unusual water demand, or for any other reason. FIG. 2 also illustrates a top liner [lever] *level* control surge tank 84 and a top liner white water storage chest 86.

While processes such as those illustrated in FIG. 2 are known to those skilled in the art, a brief description thereof will illustrate certain advantageous applications of the invention.

Beginning for example with the paper machine [vat] *pit* 66, which may be that shown also in FIG. 1, this unit receives over-flow from the various cylinder stock chests as well as water from the rollers 60, 62, 64 which squeeze water from the paper product. While a certain amount of the water from the machine [vat] *pit* 66 goes to dilute the filler and back liner stock, most of the water goes to the "save all" pit 70. This is the lowest grade of white water in the process water system. The "save all" 72 typically consists of a cylinder vat in which the smaller fibers are removed from the white water so that some reclamation of excess fibers takes place at this station. This reduces the fiber content of the white water and the fibers collected may be reused or discarded, as desired. The white water chest 74 might typically have a capacity of 10,000 to 15,000 gallons.

The white water then is passed through a surge tank 75 to the clarifier 76, which is typically a gravity clarifier known in this industry. Here, suspended colloidal material is removed from the bottom of the clarifier as a sludge and used for filler stock, while the clarified white water is passed into the ultraviolet treatment cell 78 of the invention [or into] *from the* surge tank 77. A more detailed description of the ultraviolet treatment cell 78 appears hereinafter.

From the treatment cell 78, the water may pass to the treatment cell surge tank 80 or to the clarified white water chest 82. In the alternative, some or all of the clarified [white] water may bypass the treatment cell 78 and pass, by way of lines 83, 85, [through] *from* the surge tank 80 *to the clarified water chest 82*. The clarified [white] water chest 82 contains the purest or highest quality [white] water in the process. The overflow is metered through an effluent weir, while the major portion of the clarified [white] water passes from the chest 82 to an outlet from which it is directed to the machine showers 38 or to other mill locations.

Referring again to the paper machine pit 66, it will be noted that this pit also receives the overflow from the top liner level control surge tank 84. This tank supplies the top liner white water storage chest 86 which, in turn, is used to dilute the stock marking up the top liner of the paper product.

From the foregoing, it will be seen that some fibers are periodically removed from the white water and that the white water is clarified and reused continually in the process. The tanks 84, 86 presume the use of a higher grade or different quality top liner stock, and accordingly are filled from their own paper slurry. A significant proportion of the top liner stock white water overflow goes indirectly to the save-all pit 70, where it is combined with the other process white water. The major portion of the top liner white water, however, is recirculated within the top liner white water system itself.

Figure 4:
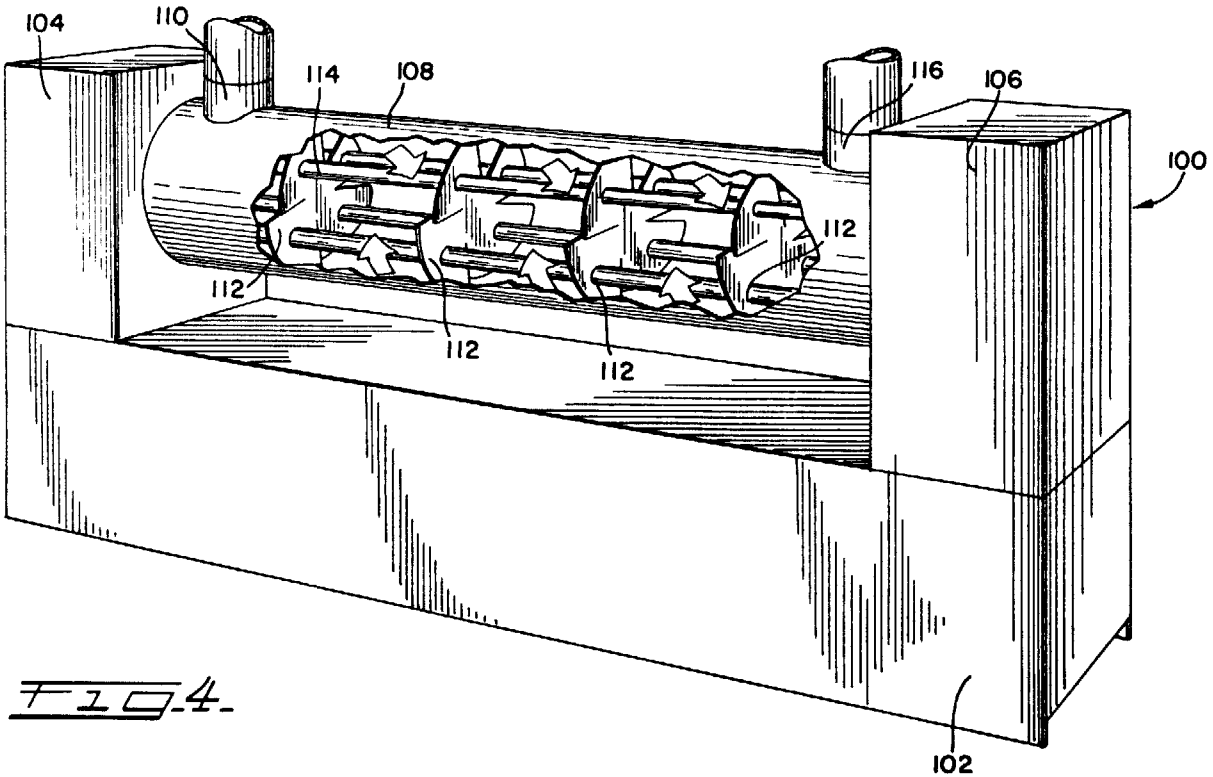
FIG. 4 is a perspective view, with portions broken away, of a typical ultraviolet light treatment apparatus suitable for use in practicing the present invention.

Referring now to the water treatment cell 78, FIG. 4 shows that this cell may consist of a commercially available ultraviolet unit generally designated 100 and sometimes used as an ultraviolet water sterilizer. A unit suitable for use in the present invention may be one sold under the trademark "Aquafine" and manufactured by the Aquafine Corporation of Burbank, California. In the form shown in FIG. 4, the unit 100 includes a main housing 102 containing the electrical components, a pair of upwardly extending supporting portions 104, 106 having between them a horizontally extending treatment tube 108. An upper inlet 110 admits water into the interior of the tube 108, with the water being directed about in a turbulent within the tube 108 by the action of the baffle plates 112. These plates 112 also serve to locate a plurality of longitudinally extending high intensity ultraviolet lamp tubes 114. Preferably, the lamps 114 are fused within transparent quartz sleeves. Consequently, water flowing into the inlet 110 and out the outlet 116 will be exposed to significant ultraviolet radiation because the polymerization initiated by the ultraviolet light may result in the precipitation of organic materials, the treatment unit 110 may be provided in parallel so that one may be turned off periodically for cleaning without interrupting the performance of the process.

As will appear, the amount of ultraviolet energy required to initial polymerization is not large and accordingly a unit such as that shown which might have a rating of from one up to twenty kilowatts, may be operated intermittently. In the alternative, a small unit having 50 watt-hour capacity may be operated continuously. The foregoing figures typify values used in a mill having a process water flow rate of 1,000 gallons per minute. The preferred form of treatment unit emits u.v. light at a [frequency] *wave length* of [2537° A] *2537* Å.

In use, assuming that the white water treated has the dissolved solids values and B.O.D.$_5$ values shown in FIG. 3, the treating unit will, over a period of a few days, reduce both dissolved solids (D.S.) and B.O.D. to about 40% of their original values and then continue to reduce these values until equilibrium is reached after about eight to fifteen days' treatment.

While the invention is not intended to be limited to any particular theory, and while any mechanism of operation does not form a necessary part of the invention, it is believed that the reaction mechanism may be explained as follows: Since a significant part of the dissolved organic material in the white water of a typical papermaking process possess a measureable biologic oxygen demand, (measured as a five day demand—B.O.D.$_5$) such organic material would have to be of relatively simple organic structure in terms of chain length and branching. That is, most or all of such compounds would have a relatively low molecular weight and would be readily biodegradable. Hypothestizing that the ultraviolet light creates free radicals which would initiate polymerization of these low molecular weight, polymerizable compounds, the early, relatively sharp drop in the B.O.D.$_5$ level, coupled with the gradual lowering of dissolved solids, indicates that the dissolved material, upon exposure to ultraviolet light, develops into more complex, less soluble and less biodegradable material.

It will be observed, in this connection, that the polymerization activity is not thought to be biologic in nature, inasmuch as the ultraviolet initiation energy is derived from a light tube which is normally used commercially as a sterilizer.

However, assuming that the molecular weight and complexity of the organic materials results from polymerization initiated by ultraviolet energy, the explanation of the mechanism is quite logical. The unsaturated and particularly conjugated structure molecules readily tend to form more complex free radicals which undergo further reactions such as those undergone in typical double bond polymerization, e.g., vinyl polymerization.

Referring now to the kinetics of the postulated reaction, the rate is not high by absolute standards, but is high considering the reaction conditions and the varied nature of the starting products. Moreover, the white water is effectively treated by the inventive process more rapidly than it would be when treated in the lagoons used in prior art treatment.

In actual use, it was noted that certain of the white waters, after being treated for an extended period, sometimes developed a brown or even dark red-brown color. This is thought to be explainable, consistent with the present hypothesis, on the basis of the eventual production of molecules having the conjugated resonant structures known to form in complex molecules.

As would be expected when polymerization continues, the molecular weight and complexity of the products is such that their solubility limits are exceeded, and the concentration of dissolved solids is reduced, simply because the complex reaction products are precipitated out of the white water. As a consequence, during and after treatment, the concentration of those soluble white water materials which create continuing and increased biochemical or biological oxygen demand is greatly reduced.

The postulate that polymerization occurs has been verified by infrared and nuclear magnetic resonance (nmr) spectroscopy of white water before treatment, and separate analysis of the supernatant white water and the sludge resulting from treatment thereof. These analyses show the initial presence of virtually no long chain materials in the supernatant layer and sludge before treatment, and show that the supernatant liquid contains virtually no such materials after treatment, but that the precipitated sludge contains significant amounts of materials having relatively great chain length and complexity.

Referring now to the certain advantages of the invention, when dissolved organic solids build up to an excessive level in papermaking white water, the resulting inordinately high biological oxygen demand, creates an anaerobic atmosphere. This encourages growth of sulfate-reducing and other thermophilic anaerobic bacteria, which in turn create highly corrosive hydrogen sulfide and other compounds which rapidly damage process equipment, sometimes even equipment made from relatively corrosion-resistant materials such as stainless steel.

As indicated above, an anaerobic atmosphere permits the bacterial which decompose the dissolved solids in the white water to create short chain organic acids, and perhaps other miscellaneous organic decomposition products. These acids, particularly, create obnoxious odors in the product, the process water system and the surrounding atmosphere, and further contributes by corrosion problems in addition to those corrosion problems caused by other mechanisms within the system.

From the standpoint of dissolved solids only, lowering the concentration of dissolved solids alleviates a problem which is common in the industry, that is, the problem of deposition of foreign materials on the machine felts, screens, etc. Such depositions occur when the paper making process is stopped or at other times when temperature of the process water is lowered. When this occurs, certain of the dissolved solid materials take a "set" and adhere to the machine felts or other machine parts, rendering these parts less porous to water. This in turn inhibits proper drainage and increases the likelihood of manufacturing an inferior product.

Referring now to another advantage of the inventive concept, by reason of the fact that white water treatment may be intermittent or continuous, the treatment cell may be placed either in series or in parallel with the white water flow system, provided only that it is clarified white water which is treated. While the invention may function to a certain extent in the presence of unclarified white water, the presence of colloidal or dispersed materials creates turbidity and light scattering which tend largely to destroy the effectiveness of ultraviolet light treatment.

Assuming that it is clarified white water which is treated, however, it will be understood that the invention operates satisfactorily whether or not the clarified white water is continuously or intermittently withdrawn from the system, and whether or not the clarified white water passing through the treatment system is treated continuously.

As long as all the water is exposed to ultraviolet light, over a period of time, statistically speaking, the treatment will be successful as long as polymerization is initiated and permitted to continue, the invention may be practiced successfully.

In this connection, it will be understood that it is not necessary that the polymerization resulting in molecules of increased size and decreased solubility occur totally in the presence of the ultraviolet light. It is believed that the polymerization process occurs throughout substantially all, or at least a major part of, the treatment cycle, with the ultraviolet energy serving only to initiate polymerization form time to time. Accordingly, it is not necessary that the ultraviolet light energy be directed to the white water for extensive lengths of time, or that the white water have any particular residence time in the u.v. treatment cell. This feature of the invention simplifies making the physical connections and "plumbing" necessary to adapt the invention to existing white water systems.

FIG. 5 shows the elements of an apparatus having the treatment cell in parallel with the flow of the bulk of the process water. As illustrated, the clarifier 176 feeds the clarified white water chest 182 through the surge tank 180. The u.v. treatment tank 178 is in a parallel or side arm configuration with respect to the line 181 between the tank 180 and the chest 182, and treats clarified white water on its way to the chest 182.

FIG. 3 illustrates the reduction of the DS and B.O.D.$_5$ values from 3600 ppm to 1500 ppm, and then downwardly towards values of less than 1,000 over the periods indicated. These values were obtained in one particular paper making operation wherein the initial values were not particularly high.

Where the initial values are much higher than those shown in FIG. 3, such as 5,000 to 8,000 ppm or more initially, as commonly occurs, and even more dramatic reduction may be obtained, inasmuch as the initial concentration is higher but final concentration can be reduced to at least the values shown. The reason for the excellent performance of the invention in systems having B.O.D.$_5$ and DS values up to 8,000 ppm and higher is that, from the standpoint of kinetics, the greater concentrations increase reaction rates. Hence, in general the method of the invention operates better and is more efficient in systems with high initial B.O.D.$_5$ and DS values.

Referring now to other possible applications of the process of the invention, it is anticipated that industries other than the paper industry can utilize the principles of the invention. For example, in industries dealing with organic products and having substantial waste water, such as malt beverage, pharmaceutical, and textile industries, those materials which in the past created effluent problems can now be polymerized, precipitated and then removed. Thus, the contaminated water can be treated effectively by this method and then [treated] discharged without polluting waterways.

The application of the process of the invention is not necessarily limited to those cases wherein the dissolved solids are only those which may be polymerized or degraded by biological action. In other words, there are several known industrial processes wherein the process water contains dissolved solids which may be polymerized to reduce their solubility, but in which the solids may be eliminated either very slowly or not at all by biological methods.

In such cases, the ultraviolet-initiated polymerization method of the invention is applicable, although the treated liquids might have minimal or no measurable B.O.D.$_5$. Accordingly, the invention is applicable to all cases wherein dissolved solids may be removed by ultraviolet-initiated polymerization resulting in eventually reduced solubility of such solids.

Referring now to another matter, namely, the heat which can be saved by using the method of the present invention, it will be assumed that the invention is being practiced in a paper mill which makes 165 tons of paper per day. A mill of this size typically discharges about 1,000 g.p.m. of white water into the treatment lagoons, and takes on an equal amount of water, which must be heated, either from treated white water or fresh water, or both.

Assuming that the inlet water has an ambient temperature 60° F., and is discharged into a treatment lagoon at 115° F., the temperature drop is 55° F. With 1,000 g.p.m. aggregating 60,000 gal./hr., 1,440,000 gal./day, and assuming the density of water to be 8.33 pounds per gallon, the total heat loss in such a system is 660,500,000 B.T.U.

According to the invention, the temperature drop of the process water can easily be limited to 1° F. or less. In such a case, only 12,000,000 B.T.U.'s would be lost, saving nearly 650,000,000 B.T.U. daily.

According to the invention, the white water may be circulated for days, weeks or even months at a time, keeping the organic dissolved solids at a desirably low level.

Another feature of the invention is that, where those low B.O.D. and organic DS levels may be maintained, biocidal control process treatments may be carried on effectively, processes were not effective *whereas such* where organic DS and B.O.D. levels are excessively high.

While the invention is useful in the recycling type papermaking operations described, wherein the starting materials are paper products of various sents, the invention process is also applicable to papermaking processes wherein the starting materials include wood pulp only, or mixtures of pulp and recycleable paper products.

It will thus be seen that the present invention provides a novel method of treating white water having desirable advantages and characteristics, including those herein pointed out and others which are inherent in the invention. Preferred embodiments of the invention having been described by way of example, it is anticipated that modifications or changes of the described processes will occur to those skilled in the art, and it is anticipated that such modified or changed processes may be practiced without departing from the spirit of the invention or the scope of the appended claims.

What is claimed is:

1. An improved method of papermaking, said method comprising dispersing papermaking fibers in a slurry, depositing said fibers from said slurry on a papermaking apparatus which includes fiber laying means and a white water recovery system, recovering the white water from said papermaking machine and elsewhere in the papermaking process, clarifying said white water after recovery thereof from said papermaking apparatus, and thereafter at least intermittently exposing said clarified white water to ultraviolet light of sufficient wavelength and quantity to initiate polymerization of dissolved solid materials contained in said papermaking white water into more complex, less soluble molecular structure, permitting said polymerization to continue until said substantial portions of said dissolved solid materials become insoluble, and periodically removing said insolubilized materials from said clarified white water while recirculating said white water within said papermaking apparatus.

2. A method as defined in claim 1 which includes the step of continuing said exposure of papermaking white water until said reduced concentration reaches equilibrium, and thereafter maintaining said exposure at a rate sufficient to maintain said equilibrium.

3. A method as defined in claim 1 wherein said exposure of said papermaking white water is accomplished by removing sample portions of clarified papermaking white water from said papermaking process from time to time, and continually exposing said withdrawn sample portions of said papermaking white water to said ultraviolet light, and subsequently returning said exposed sample portions of said treated papermaking white water to said papermaking process.

4. A method as defined in claim 1 wherein all of said papermaking white water is passed through a ultraviolet light exposure treatment cell, and wherein said papermaking white water in said treatment cell is periodically exposed to said ultraviolet radiation.

5. A method as defined in claim 1 wherein said polymerization is carried out by a reaction mechanism which produces free radicals of increasingly complex molecular structure.

* * * * *